(12) United States Patent
Lesguillier et al.

(10) Patent No.: US 6,727,804 B1
(45) Date of Patent: Apr. 27, 2004

(54) POWER LINE COMMUNICATION SYSTEM AND METHOD

(75) Inventors: Eric Lesguillier, Saint-Rédempteur (CA); Yves Roy, Beauport (CA); Pierre Longtin, Île d'Orleans (CA)

(73) Assignee: Domosys Corporation, Quebec (CA)

(*) Notice: Subject to any disclaimer, the term of this patent is extended or adjusted under 35 U.S.C. 154(b) by 97 days.

(21) Appl. No.: 10/201,546

(22) Filed: Jul. 23, 2002

(51) Int. Cl.$^7$ ............................................. H04M 11/04
(52) U.S. Cl. ............................. 340/310.03; 340/310.01
(58) Field of Search .................. 340/310.01, 310.02, 340/310.03, 310.04, 310.06, 870.18, 870.19, 870.31; 370/252, 305, 318, 527; 714/712; 330/51, 267, 296; 455/78, 112, 124

(56) References Cited

U.S. PATENT DOCUMENTS

| | | | | |
|---|---|---|---|---|
| 3,783,387 A | * | 1/1974 | Wernli | 340/870.18 |
| 4,772,870 A | * | 9/1988 | Reyes | 340/310.02 |
| 5,239,686 A | | 8/1993 | Downey | 455/78 |
| 5,241,283 A | | 8/1993 | Sutterlain | 330/51 |
| 5,257,006 A | | 10/1993 | Graham et al. | 340/310 |
| 5,347,549 A | | 9/1994 | Baumann et al. | 375/117 |
| 5,448,231 A | * | 9/1995 | Takezoe et al. | 340/310.01 |
| 5,812,557 A | * | 9/1998 | Stewart et al. | 714/712 |
| 5,952,914 A | | 9/1999 | Wynn | 340/310.01 |
| 6,229,432 B1 | | 5/2001 | Fridley et al. | 340/310.01 |

OTHER PUBLICATIONS

Monticelli et al., A Carrier Transceiver IC for Data Transmission Over the AC Power Lines, 12/82, pp. 1158–1165, IEEE Journal of Solid-State Circuits, vol. SC–17, No. 6.

* cited by examiner

*Primary Examiner*—Van Trieu
(74) *Attorney, Agent, or Firm*—Bourque & Associates PA

(57) ABSTRACT

The power line communication system includes a transmitter and a receiver, both providing a communication path between two communication control devices over a power line. The transmitter includes a voltage amplifier and a current amplifier. A switch between the transmit and receive modes is implemented within the voltage amplifier. The current amplifier also has a two-step output impedance. When the transmitter is active, the current amplifier shows a low impedance on the line to overcome other loads. If, however, the communication medium shows a high level of noise, the output impedance of the current amplifier decreases even further and creates a path to ground. The receiver advantageously uses a logarithmic amplifier for signal range compression. This type of amplifier preserves the shape of the signal that is important when the modulation scheme uses the zero crossings to store information. At the receiver, the communications control device mixes a reference signal with signals received on the power line. The mixed signal is then amplified before passing to the receiver output. At the communication control device, the reference signal is demodulated so as to detect whether what is received is noise or a communication signal.

16 Claims, 6 Drawing Sheets

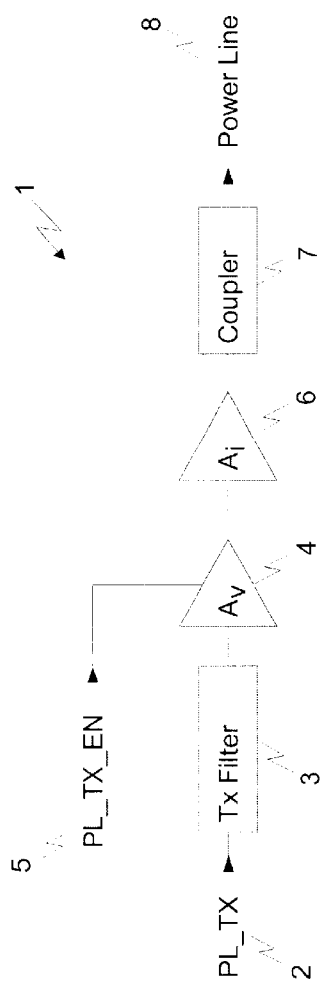
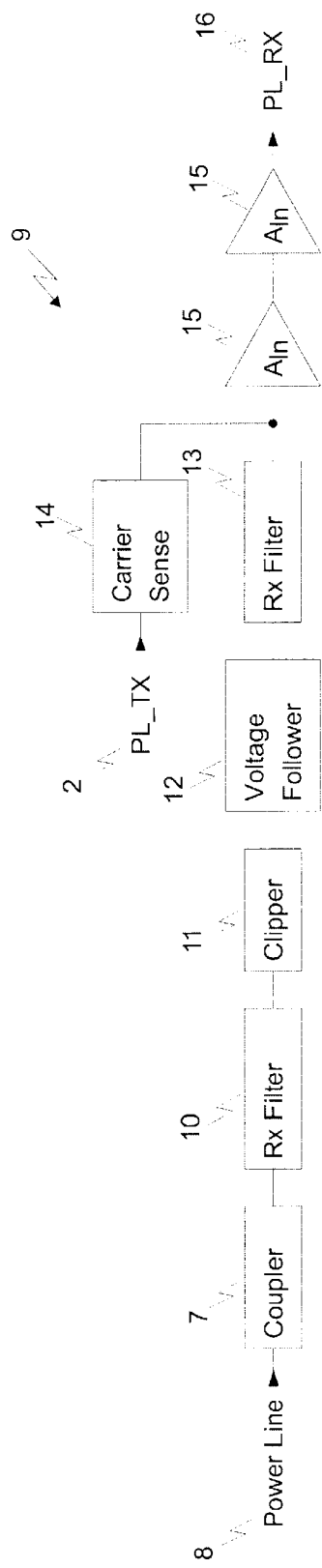
Figure 1a
Figure 1b

POWER LINE COMMUNICATION SYSTEM AND METHOD

BACKGROUND

Over the years, a number of different systems involving power line communication (PLC) have been suggested. The greatest benefit of these systems is that they use existing power lines as a communication medium instead of using costly wireless equipment or dedicated communication wiring and hardware. For instance, installation of a dedicated wiring in an existing building can be costly, difficult to achieve and not desirable, especially if it involves the destruction of walls, ceilings or the like. This provides a strong motivation to use existing power lines for communication purposes in addition to their use for power distribution, thereby taking advantage of the already existing electrical network that is present in almost any building, whether industrial, commercial or residential.

While the idea of using PLC has resulted in a number of different constructions, none has been found completely satisfactory and acceptance was thus limited. Most limitations of prior systems result from inherent obstacles encountered when communicating over power lines. Since power lines were not intended to provide a communication medium, problems and impairments must be overcome in order to develop a reliable communication system. Very often, these problems have led to inconsistent and unreliable performance in previous PLC systems. The major challenges in the development of this technology include various noise sources, such as white noise (noise generated by electrical appliances), harmonic distortion, and signal attenuation (attenuation due to lengthy connection and varying impedance). These problems are not significant when distributing electricity at 60 hertz. However, when transmitting communication signals in the kilohertz range and above, they can become obstacles.

SUMMARY

The object of the present invention is to provide satisfactory PLC between two communication control devices, this being achieved in a way which reduces, if not obviate, the difficulties and disadvantages of the existing systems through a number of improvements.

In the present invention, the power line communication system comprises a transmitter and a receiver interfaced between each communication control device and the power line. At the receiver, communication signals are amplified and transmitted to the power line. At the other end, the receiver receives the communication signals from the power line, preferably conditions the signals and then amplifies them before they are sent to the corresponding communication control device.

A first aspect of the present invention is that the output impedance of the transmitter can be selectively switched between an enabled and disabled state. Also, to compensate for different medium conditions such as loading of the power line by other appliances or surrounding noise, the output impedance of the transmitter is advantageously capable of automatically switching between two steps of low impedance. The first step allows for reliable transmission to account for other impedances on the power line, while the other decreases noise seen on the power line.

Another aspect of the present invention is that the receiver advantageously uses a logarithmic amplifier to preserve the phase of the signal and therefore keeps the information stored in the x-axis intercepts.

A further aspect of the present invention is to provide the receiver with a carrier sense function. With this carrier sense function, when in the receiving mode, a reference signal mixes with the incoming communication signal. If the received signal on the power line is lower than the reference signal, correct demodulation of the reference signal is performed by the communication control device and the received signal is seen as noise. However, if the received signal on the power line is higher than the reference signal, demodulation errors occur at the communication control device, thereby indicating that the received signal is an actual message.

Another aspect of the present invention is to provide the option of communicating signals through the ground and neutral wires, which could be useful in certain circumstances. For instance, this scheme could be used if the risk of signal degradation through the phase and neutral lines becomes too high.

These and other aspects and advantages of the present invention are described in or apparent from the following detailed description of the preferred embodiment made in conjunction with the accompanying figures.

BRIEF DESCRIPTION OF THE FIGURES

FIGS. 1a and 1b are block diagrams respectively illustrating the transmitter and receiver in accordance with the preferred embodiment of the invention;

DETAILED DESCRIPTION

* OVERVIEW *

Figure 2A:
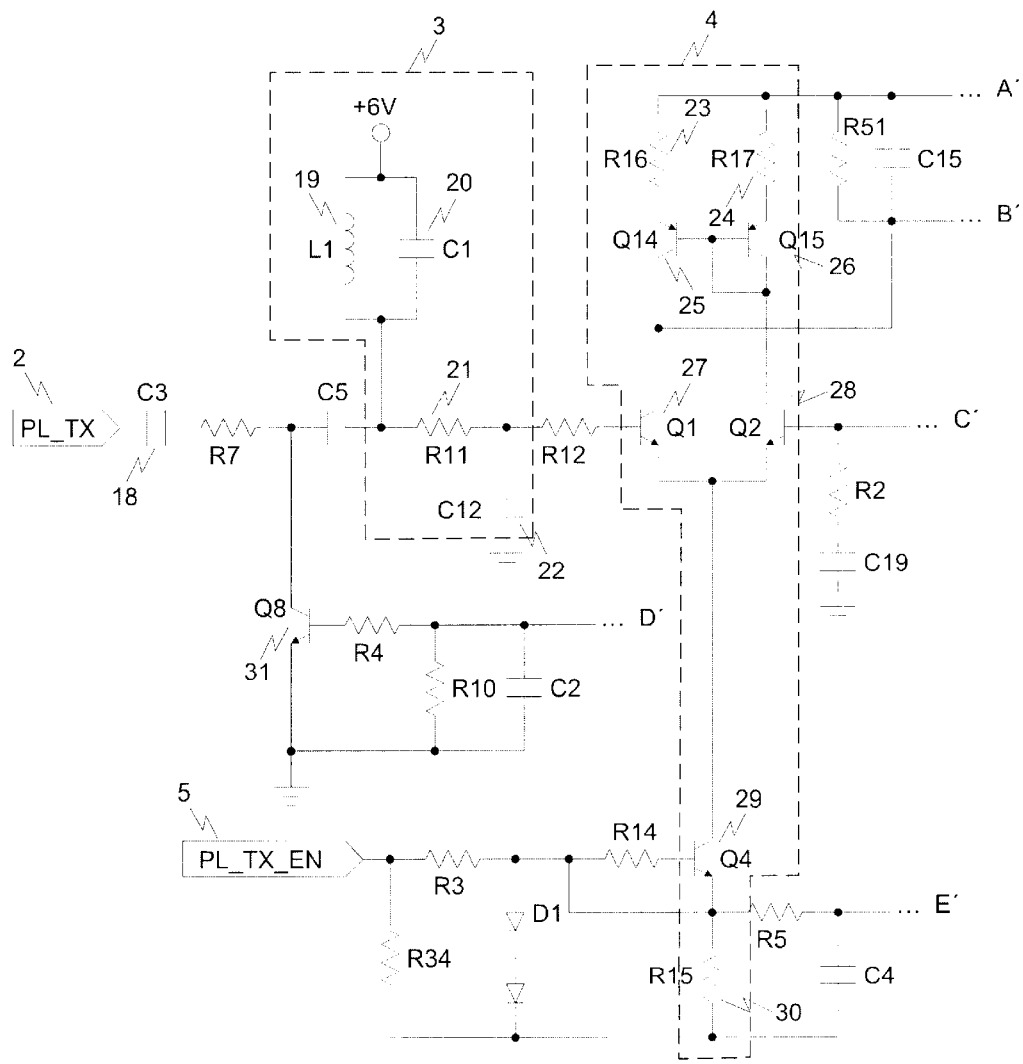
FIGS. 2a and 2b are circuit diagrams of the transmitter in accordance with the preferred embodiment of the invention.

A communication system comprises a transmitter and a receiver, both acting in concert. FIG. 1a shows an upper block diagram of a preferred embodiment of the transmitter (1). This illustrated transmitter (1) includes a low-pass transmission filter (3), a voltage amplifier (4), a current amplifier (6), and a communications coupler (7) that couples the output of the transmitter (1) to a power line (8). It should be noted that expression "power line (8)" generally refers to an AC or DC conductor wire which is capable of providing a communication path from the transmitter (1) to an opposite receiver (9). The power line (8) can be alive or not. For instance, the power line (8) could be an abandoned wire. Furthermore, although the present invention presents the greatest benefits when used with existing wires in a building, it is possible to use it with newly installed wires and benefit from other advantages thereof. It could also be used with a twisted pair wire.

There are many possible configurations for the communication system. Depending on the needs, the communication link can be unidirectional or bi-directional between two opposite communication control devices (not shown). The communication control device can be, for instance, a microchip such as a Domosys U-Chip™, which is built around an Intel 8052-based core. Of course, other kinds of communication control devices can be used as well. Possible configurations for the communication system include having one communication control device coupled only to a transmitter (1) and another one only to a receiver (9). It is also possible to have more than one transmitter (1) for each receiver (9), and vice-versa. However, the present invention is advantageously used in a bi-directional communication environment. Each communication system then comprises a transmitter (1) and an adjacent receiver (9), both being preferably provided on the same printed circuit board (PCB) or in the same box.

Referring again to FIG. 1a, the voltage amplifier (4) of the transmitter (1) includes a control input that couples to a control signal (5) while in operation. This control signal (5) preferably outputs from a terminal of the corresponding communication control device. The control signal (5) is referred to as the "PL_TX_EN" enable signal (5) hereafter. The PL_TX_EN enable signal (5) enables or disables the voltage amplifier (4), thus controlling when the transmitter (1) is active or not. It does so by controlling the selection between a low and a high impedance level, as seen at the output of the transmitter (1).

When the transmitter (1) is active, a communication signal (2) generated by the communication control device enters the transmitter (1) through its signal input. The communication signal (2) is referred to as the "PL_TX" input signal (2) hereafter. The communication signal (2) is preferably first sent through a low-pass band filter (3) to eliminate high frequencies. This filtered signal is then fed to the voltage amplifier (4). From the voltage amplifier (4), the current amplifier (6) acts as a follower amplifier and follows the output of the voltage amplifier (4). The communications coupler (7) connects the output of the transmitter (1) to the power line (8).

FIG. 1b shows a block diagram of the preferred example for the receiver (9). The PL_TX in put signal (2) transported through the power line (8) enters at the input of the receiver (9) through the communications coupler (7) and is conditioned afterwards. It preferably passes through three stages of high-pass filters in the receiver filter (10) to remove low frequency noise. It should be noted that the energy of the noise in a conventional power line was found to be below about 120 kHz. The next stage of conditioning is preferably a clipper (11) that clips the signal, for instance at 0.6 V, to limit ringing and protect the receiver (9). The signal is clipped after it has passed through the receiver filter (10) so as to avoid signal distortion. The signal is then preferably transmitted to the voltage follower (12), which offers lower output impedance than the previous stage. Following this, the signal preferably goes through a second receiver filter (13), which includes both a low-pass and high-pass filter. The goal of this second receiver filter (13) is to isolate only the first harmonic of the received signal and eliminate any distortion. There is no signal amplification however. Amplification is done in the next stage, preferably with a logarithmic amplifier (15). This type of amplifier is used to achieve signal range compression. The receiver (9) preferably includes two logarithmic amplifiers (15) to provide a wider range of signal amplification.

Finally, the receiver (9) outputs a signal that is referred to as the "PL_RX" output signal (16), which outputs at the signal output of the receiver (9) and passes to the communication control device for further processing.

* TRANSMITTER *

Figure 2B:
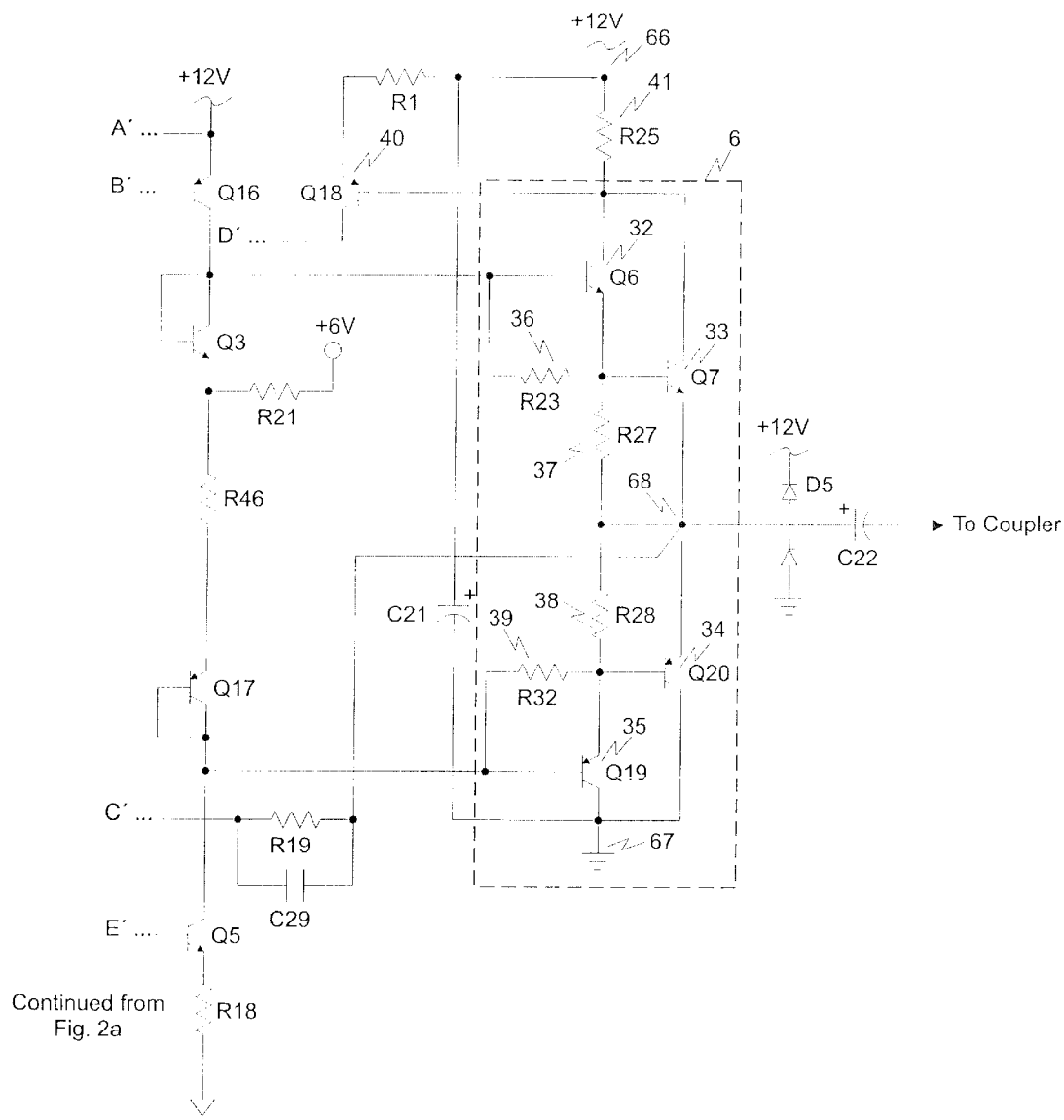

FIGS. 2a and 2b depict the preferred circuit diagram of the transmitter (1). FIG. 2a shows the first half of the transmitter (1). As the PL_TX input signal (2) enters the transmitter (1), it passes through AC coupling capacitor C3 (18). From there, the low-pass band filter (3) removes high frequency noise. The low-pass band filter (3) preferably comprises inductor L1 (19), resistor R11 (21) and capacitors C1 (20) and C12 (22). The filtered signal then couples to one of the inputs of the voltage amplifier (4). The voltage amplifier (4) preferably includes bipolar junction transistors (BJTs) Q1 (27), Q2 (28) as well as an active load and a current source. The active load is a current mirror circuit comprising of resistors R16 (23) and R17 (24), as well as BJTs Q14 (25) and Q15 (26). The source of the differential amplifier is BJT Q4 (29) and resistor R15 (30). The output of the voltage amplifier is coupled to the input of the current amplifier (6). The function of BJT Q8 (31) involves elements in FIG. 2b that is described next.

FIG. 2b depicts the preferred embodiment for the second half of the transmitter (1). The combination of BJTs Q8 (31) (from FIG. 2a) and Q18 (40) with resistor R25 (41) forms a thermal protection circuit. This circuit senses the temperature of the circuit and BJT Q8 (31) turns on in the event that the temperature exceeds a preset value. This BJT Q8 (31) decreases the amplitude of the input signal, thus regulating the output and the temperature.

The current amplifier (6) preferably comprises four BJTs Q6 (32), Q7 (33), Q20 (34) and Q19 (35) as well as resistors R23 (36), R27 (37), R28 (38) and R32 (39). BJTs Q6 (32) and Q7 (33) are both NPN transistors and Q20 (34) and Q19 (35) are PNP transistors. There are also two bias voltages: the high power rail (66) and a circuit ground (67). The collectors of BJTs Q6 (32) and Q7 (33) are biased by power rail (66) through R25 (41). The collectors of BJTs Q19 (35) and Q20 (34) are biased by the circuit ground (67). The output from the voltage amplifier (4) couples to the bases of BJTs Q6 (32) and Q19 (35). The emitters of Q7 (33) and Q20 (34) join at the output node (68). Resistor R27 (37) has a controlling terminal coupled to the emitter of BJT Q6 (32) and the base of BJT Q7 (33) and its other terminal follows the output signal at the output node (68). Resistor R28 (38) also has a controlling terminal and it couples to the emitter of BJT Q19 (35) and the base of BJT Q20 (34). Its other terminal follows the output signal at output node (68).

Under normal conditions, BJTs Q7 (33) and Q20 (34) do not conduct. The output resistance is given by the parallel combination of resistors R27 (37) and R28 (38). In the preferred embodiment, these resistors are set at 4.7 ohms. The output impedance with these resistor values is approximately 2.3 ohms. This low impedance is required to attenuate the noise on the power line (8) as seen by the opposite receiver (9). Since electrical appliances that are coupled to the power line (8) show low impedance on the power line (8), it is necessary that the interface must present a lower impedance to overcome the effects of electrical appliances. This impedance constitutes the first level of the two-step impedance.

In the event of a noisy signal coming through the coupler, the current through BJTs Q6 (32) and Q19 (35) increases and likewise, the current through resistors R27 (37) and R28 (38) also increases. When the voltage across each of these two resistors exceeds the forward bias voltage (preferably about 0.6 V) of BJT Q7 (33) and the forward bias voltage of BJT Q20 (34), these two transistors begin to conduct and short the noise to the circuit ground (67). When these two transistors (33,34) are in conduction, the output impedance of the current amplifier (6) decreases even further, for instance to 0.1 ohm, a value that represents the output impedance of BJTs Q7 (33) and Q20 (34). This constitutes the second level of the two-step impedance. Thus, depending on the noise conditions on the power line (8), the transmitter's output stage automatically selects one low impedance or the other.

As can be appreciated, one of the main advantages of having BJTs Q7 (33) and Q20 (34) is that if the power line (8) is noisy during the receive cycle, the transmitter (1) shorts the noise to the circuit ground (67) before it saturates the receiver (9). To do this, however, the output of the transmitter (1) should be configurable so it can switch from a low impedance to a high impedance. Whereas the receiver (9) is preferably always on, the transmitter (1) must be set to a high impedance state (disabled state) when not transmitting. This is preferably done with the PL_TX_EN enable signal (5). As shown in FIG. 2a, the voltage amplifier (4) preferably uses BJT Q4 (29) as a source bias for its operation and the PL_TX_EN enable signal (5) is coupled to the base of BJT Q4 (29). In this manner, the transmitter's impedance can be made configurable depending on the state of the PL_TX_EN enable signal (5).

It should be noted that in the design of communication systems, it is generally imperative to meet the standards of the U.S. Federal Communications Commission (FCC) and European Committee for Electrotechnical Standardization (CENELEC) for low harmonic distortion. Accordingly, when a signal is being transmitted onto the power line (8), and the line impedance is more than a limit value, for instance 15 ohms, BJTs Q7 (33) and Q20 (34) should not conduct so that the harmonic distortion stays at a low level.

* RECEIVER *

Figure 3A:
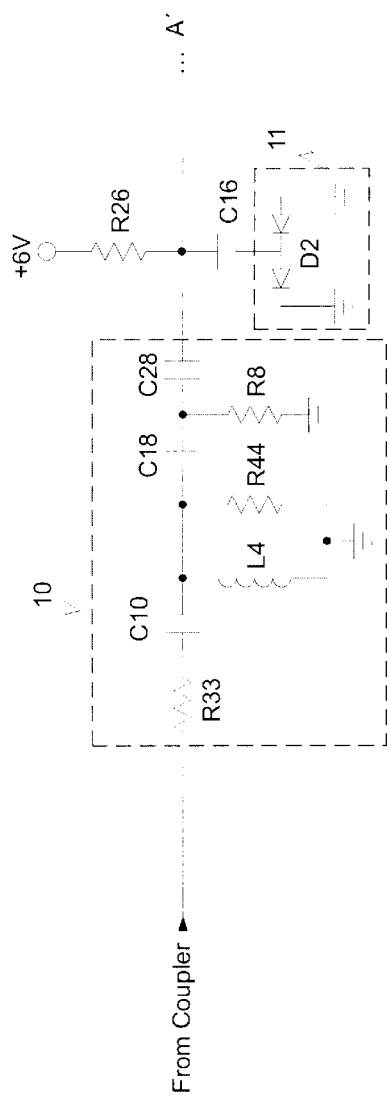
FIGS. 3a, 3b and 3c are circuit diagrams of the receiver in accordance to the preferred embodiment of the invention.
Figure 3B:
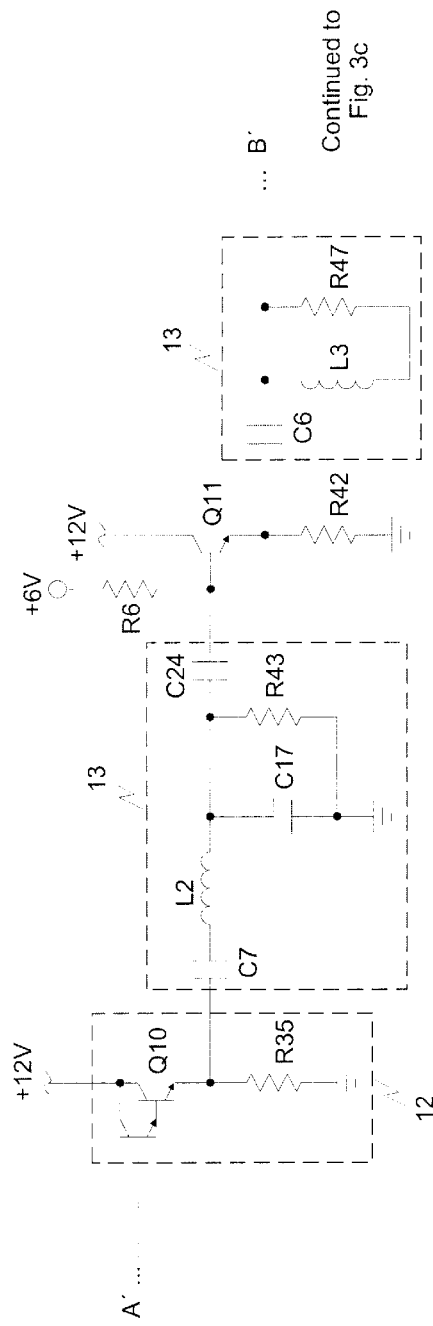

FIGS. 3a and 3b depict the preferred embodiment for the first half of the receiver (9). As described earlier, the communication signal coming from the power line (8) preferably goes through three stages of high-pass filters in the receiver filter (10) to remove low frequency noise as it enters the receiver (9). After the receiver filter (10), a clipper (11) is preferably used to remove ringing. Then, before the next stage of filtering, a Darlington pair is preferably used as a voltage follower (12) so as to reduce the output impedance as seen by the second receiver filter (13).

Figure 3C:
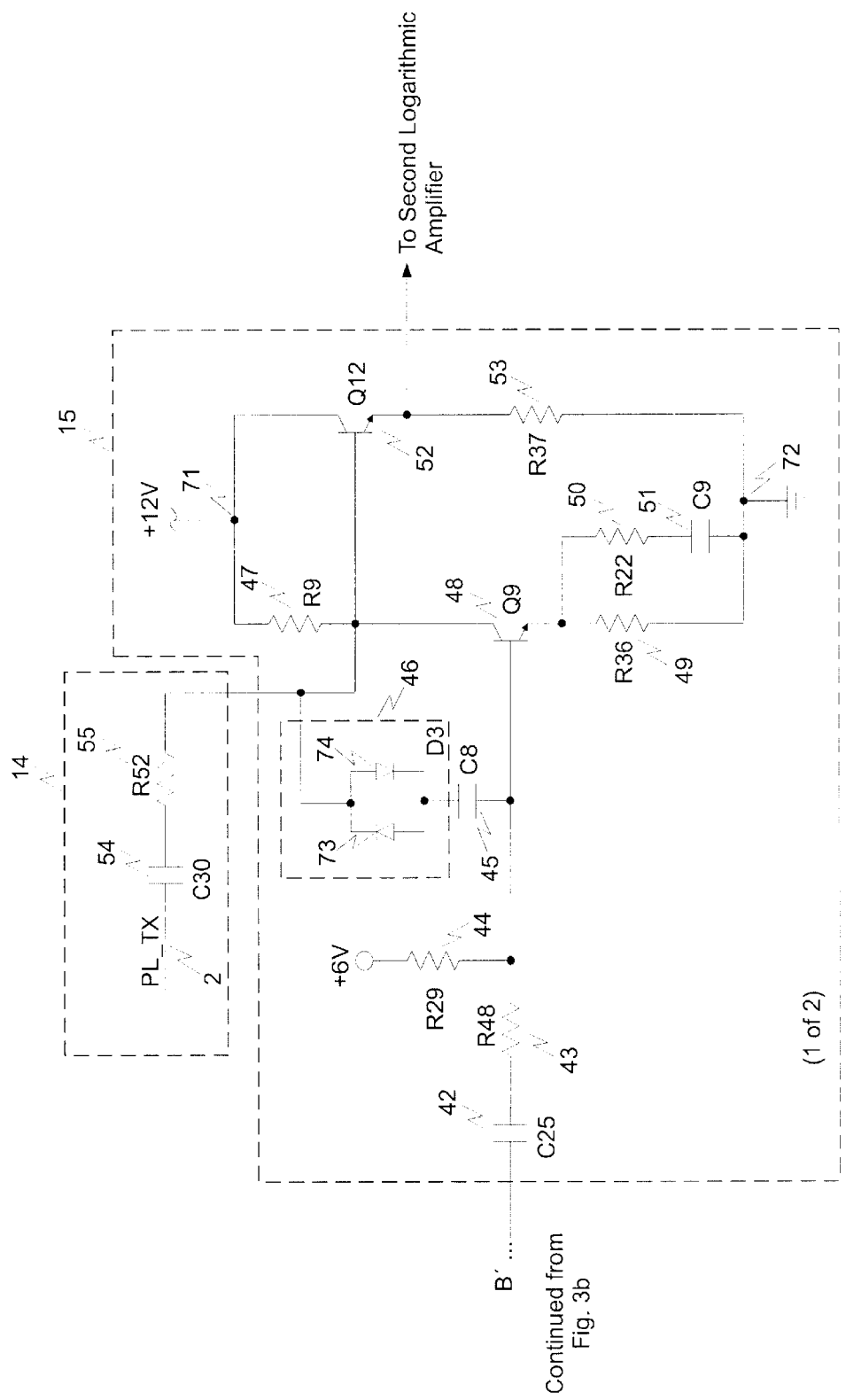

FIG. 3c depicts the preferred embodiment for one logarithmic amplifier (15) and the carrier sense (14). The logarithmic amplifier (15) comprises two NPN BJTs Q9 (48) and Q12 (52). The logarithmic amplifier also preferably includes resistors R48 (43), R9 (47), R22 (50), capacitor C8 (45), diode group D3 (46) and two bias voltage sources: power rail (71) and the circuit ground (72). Diode group D3 (46) consists of two parallel diodes (73,74) oppositely polarized. The input of the receiver (9) couples to the input terminal of resistor R48 (43). Its other terminal is coupled to the base of BJT Q9 (48). Capacitor C8 (45) is also coupled to the base of BJT Q9 (48) and its other terminal couples to the anode of diode (73) and to the cathode of (74). The cathode of diode (73) and the anode of diode (74) both couple to the collector of BJT Q9 (48). Resistor R9 (47) has a biasing terminal that couples to the power rail (71) and its other terminal couples to the collector of BJT Q9 (48). Resistor R22 (50) couples to the emitter of BJT Q9 (48) at one terminal and its second terminal couples to the circuit ground (72). BJT Q12 (52) couples its collector to the power rail (71), its base to the collector of BJT Q9 (48) and its emitter couples to resistor R37 (53).

As stated earlier, the logarithmic amplifier (15) varies the signal range on an exponential basis. If the input signal is small, then the gain level of the illustrated amplifier (15) is controlled by the ratio of resistors R9 (47) and R22 (50). If the output signal is greater than a predetermined value, for instance 0.6 V, D3 (46) begins to conduct and adding capacitor C8 (45) into the circuit. The combination of resistor R48 (43) and capacitor C8 (45) reduces the input signal, thereby decreasing the gain. With the diode group D3 (46) in conduction, the collector of BJT Q9 (48) is limited, for instance to 0.7 V. This eliminates any ringing of the signal caused by previous filter stages. Owing to the logarithmic response of D3 (46), the shape of the signal is preserved. This is important since the information being transmitted is not in the amplitude of the signal, but in the phase or the zero-crossings (x-axis intercepts).

There is a requirement in a bi-directional communication environment to detect if messages are currently being received on the power line (8) before attempting to start a transmission; otherwise simultaneous transmissions and performance degradation ensue. Since both noise and a communication signal can be present on the power line (8) at any given moment, it is necessary to differentiate noise from communication signals to achieve reliable signal detection at the communication control device. To do so, noise level measurements and strength evaluation of the communication signals are preferably done with the carrier sense (14). In use, the communication control device passes the PL_TX input signal (2) to the transmitter (1) and also injects it into the receiver (9) at a supplementary input. The PL_TX input signal (2) preferably goes through capacitor C30 (54), resistor R52 (55) an then into the collector of BJT Q9 (48) to act as a "carrier sense", hereafter referred to as a reference signal. It is then mixed with the signal as seen by the input of the receiver (9). At the same time, the communication control device puts the adjacent transmitter (1) into its high impedance state to prevent transmission of the reference signal on the power line (8). It can be seen that by controlling the attenuation of the transmitted signal, a measure of the power of the received signal can be made. The idea is to calibrate the reference signal so that when a received signal is lower than the calibrated reference signal, correct demodulation of the reference signal results. The received signal is then seen as noise by the communication control device. However, if the received signal is higher than the reference signal, demodulation errors ensue, thereby indicating the presence of a valid message signal. Having the reference signal adjusted until its level surpasses that of the received signal indicates a minimum level of the reference signal. This minimum value depends on the noise level and it varies in time. Preferably, to select this lower value, noise level measurements are made. During such a measurement, the level of the reference signal is swept from its smallest to its largest possible value when there is only noise on the power line (8). The first level of the reference signal for which there is no demodulation error is then associated to the noise floor. The communication control signal can then decide about the minimum level of the reference signal to use for communication signal detection until the next noise level measurement. This ensures that no signal is detected when there is no transmission of a communication signal on the power line (8). The received signal usually represents the noise level on the power line (8), but in the case where an actual communication signal is seen at the receiver (9), more iterations are preferably done. The iterations lead to an evaluation of an "average" noise level and the lower level of reference signal to use for communication signal detection. The communication control device can also take advantage of the system's communication protocol to synchronize its noise level measurements with the absence of communication signals on the power line (8). Furthermore, by using the PL_TX input signal (2) and controlling the PL_TX_EN enable signal (5), there is no requirement for additional circuitry or pins for the carrier sense function in the communication system.

* COMMUNICATION USING THE GROUND WIRE *

Figure 4:
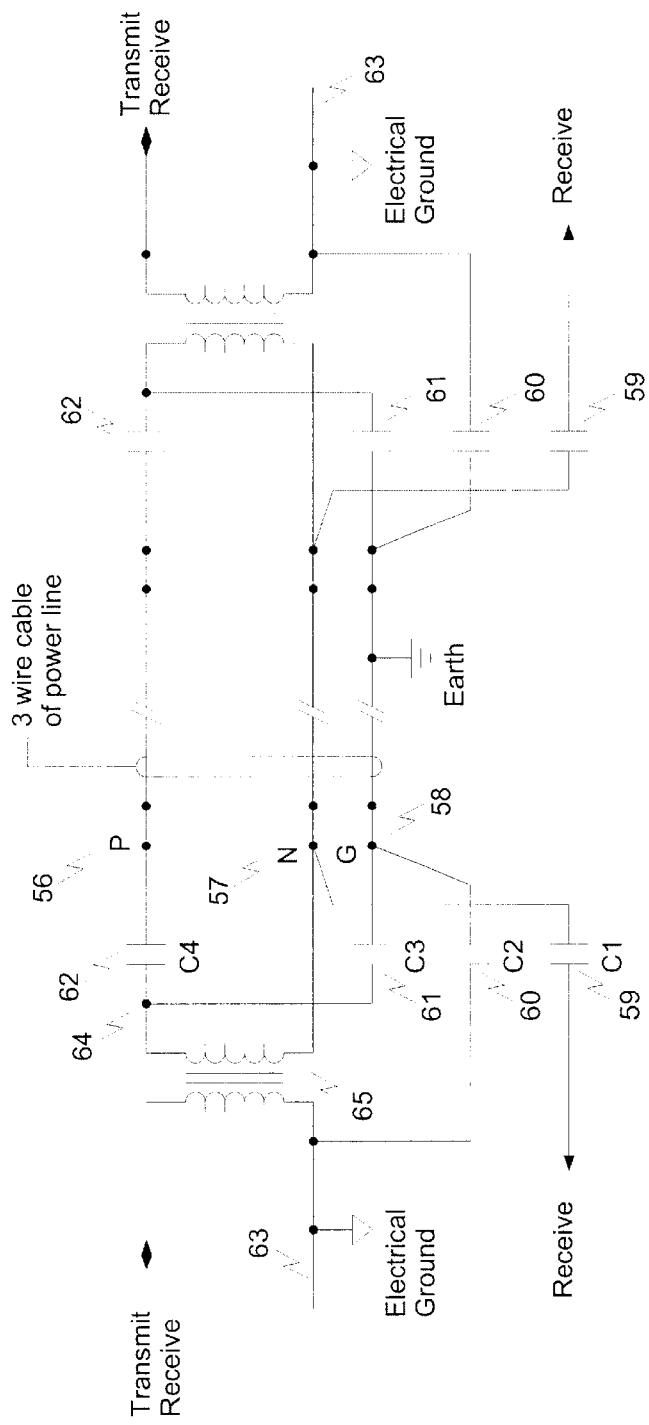
FIG. 4 is a circuit diagram illustrating an embodiment where communication is achieved through the ground and neutral wires.

A standard power line medium consists of a three-wire cable, namely phase, neutral and ground wires. It is common practice to pass information between the phase and neutral wires, although there is a great risk of signal degradation through noise. However, it was found that the communication system can advantageously be used with the ground wire as another option in the communication process. In addition to having the phase and neutral wires carry communication signals, the ground and neutral pair can carry them as well. This optional configuration is shown in FIG. 4. This illustrated embodiment shows the three wire power line including the phase wire (56), neutral wire (57) and earth ground wire (58). Capacitor C1 (59) is between the neutral wire (57) to the input of the receiver (9). Capacitor C2 (60) is between earth ground wire (58) to the circuit ground (63). Capacitor C3 (61) is between the earth ground wire (58) and the positive terminal of the isolation transformer (65). Capacitor C4 (62) is between the phase wire (56) and the positive terminal of an isolation transformer (65). The idea is to couple the phase wire (56) and the earth ground wire (58) with capacitor C3 (59). Since a power line communication system is very sensitive, it is able to receive and decode small signals between the earth ground and neutral wires (58,57). Capacitors C1 (59) and C2 (60) are small capacitors, i.e. preferably in the range of about 330 picofarads. Capacitor C3 (61) is a designer's choice and depends on how much ground current would be acceptable. Capacitor C4 (62) is a value stronger than the other capacitors so as to be able to transmit on the phase and neutral wires (56,57).

As aforesaid, the above-mentioned arrangement offers an alternate solution if the noise on the phase and neutral wires makes reception difficult. Other advantages are obtained as well. For instance, signal attenuation is not a great concern due to the low load levels.

What is claimed is:

1. A power line communication system for transmitting communication signals between a first and a second communication control device over a power line, the communication system comprising:
    a transmitter having a signal input and a control input connecting to the first communication control device, and a signal output connecting to the power line, the transmitter comprising:
        a voltage amplifier having a first input connected to the signal input, a second input connected to the control input, and an output, the voltage amplifier comprising means for selectively switching it between an enabled and disabled state in response to a control signal received at its second input; and
        a current amplifier having an input and an output, the input being connected to the output of the voltage amplifier, the current amplifier comprising means for switching the output thereof between two levels of low impedance in function of noise level over the power line; and
    a receiver having a first signal input connecting to the power line, a second signal input connecting to the second communication control device and a signal output connecting to the second communication control device, the receiver comprising:
        means for mixing a reference signal received at the second signal input with the signals received at the first signal input to create mixed signals; and
        means for amplifying the mixed signals before the signal output.

2. A power line communication system according to claim 1, wherein the means for amplifying the mixed signals comprises a logarithmic amplifier.

3. A power line communication system according to claim 1, further comprising a low-pass filter connected between the signal input of the transmitter and the first input of the voltage amplifier.

4. A power line communication system according to claim 1, further comprising means for conditioning a signal received at the first signal input of the receiver.

5. A power line communication system according to claim 4, wherein the means for conditioning a signal in the receiver comprise at least one high-pass band filter.

6. A power line communication system according to claim 5, wherein the means for conditioning a signal in the receiver comprise a voltage clipper connected at an output of the high-pass band filter.

7. A power line communication system according to claim 6, wherein the means for conditioning a signal in the receiver comprise a voltage follower connected at an output of the voltage clipper.

8. A power line communication system according to claim 7, wherein the means for conditioning a signal in the receiver comprise a combined low-pass and high-pass band filter connected at an output of the voltage follower, the reference signal being mixed with the conditioned signal after the output of the combined filter.

9. A power line communication system according to claim 1, wherein the power line has a phase, a neutral and an earth ground wire, the system comprising:
    a circuit ground;
    a first capacitor having a first and a second terminal, the first terminal being connected to the phase wire;
    a second capacitor having a first and a second terminal, the first terminal of the second capacitor being connected to the second terminal of the first capacitor, the second terminal of the second capacitor being connected to the earth ground wire;
    a third capacitor having a first and a second terminal, the first terminal of the third capacitor being connected to the circuit ground and the second terminal being connected to the earth ground wire; and
    a fourth capacitor having a first and a second terminal, the first terminal of the fourth capacitor being connected to the neutral wire and the second terminal of the fourth capacitor being connected to the first input of the receiver.

10. A power line communication system having a transmitter provided with a signal input and a signal output, the transmitter comprising:
    a first transistor having a bias terminal for receiving a first bias voltage, an input terminal coupled to the signal input, and a controlling terminal;
    a second transistor having a bias terminal for receiving a second bias voltage, an input terminal coupled to the signal input, and a controlling terminal;
    a first resistor having a first terminal coupled to the controlling terminal of the first transistor and a second terminal coupled to the signal output;
    a second resistor having a first terminal coupled to the controlling terminal of the second transistor and a second terminal coupled to the signal output;
    a third transistor having a biasing terminal for receiving the first bias voltage, an input terminal coupled to both the controlling terminal of the first transistor and the first terminal of the first resistor, and an output terminal coupled to the signal output, the third transistor outputting a first forward bias voltage;

a fourth transistor having a biasing terminal for receiving the second bias voltage, an input terminal coupled to both the controlling terminal of the second resistor and the first terminal of the second resistor, and an output terminal coupled to the signal output, the fourth transistor outputting a second forward bias voltage;

whereby, in use, the signal output assumes a first output impedance state limited by the first and second resistors when the voltage across the first resistor is less than the first forward bias voltage, and the signal output assumes a second output impedance state, being lower than the first output impedance, limited by the third and fourth transistors when the voltage across the first resistor is greater than or equal to the first forward bias voltage.

11. A power line communication system having a receiver provided with a signal input and a signal output, the receiver comprising:

a first transistor having an output terminal, an input terminal and a controlling terminal;

a first resistor having a first terminal coupled to the signal input, and a second terminal coupled to the input terminal of the first transistor;

a capacitor having a controlling terminal and a reference terminal, the reference terminal being coupled to the input terminal of the first transistor;

a first diode having its anode coupled to the output terminal of the first transistor, and its cathode coupled to the controlling terminal of the first capacitor, the first diode outputting a first forward bias voltage;

a second diode having its anode coupled to the controlling terminal of the capacitor, and its cathode coupled to the output terminal of the first transistor, the second diode outputting a second forward bias voltage;

a second resistor having a first terminal coupled to the first input bias voltage source, and a second terminal coupled to the output terminal of the first transistor;

a third resistor having a first terminal coupled to the controlling terminal of the first transistor, and a second terminal coupled to a second input bias voltage source;

whereby, in use, when a signal received at the signal input has a level below the forward bias voltage, the gain is given by the ratio of the second and third resistors, and when the signal received at the signal input has a level above the forward bias voltage, the diodes go into conduction and the combination of the resistor and the capacitor reduce the gain.

12. A method of transmitting communication signals between a first and a second communication control device over a power line, the method comprising:

receiving a communication signal at an input of a transmitter from the first communication control device;

amplifying the communication signal;

selecting from one among two low impedance settings at an output of the transmitter in response to noise level on the power line;

transmitting the communication signal over the power line;

receiving the communication signal at an input of a receiver;

amplifying the communication signal received at the input of the receiver;

outputting the amplified communication signal at an output of the receiver;

receiving the communication signal at the second communication control device; and detecting whether what the second communication control device is receiving is noise over the power line or the communication signal.

13. A method according to claim 12, wherein the step of detecting whether what the second communication control device is receiving is noise over the power line or the communication signal includes:

mixing a reference signal with what is received at the receiver and before amplification therein;

demodulating the reference signal at the second communication control device, and upon determining that there are demodulation errors, detecting the presence of the communication signal.

14. A method according to claim 12, further comprising:

initially enabling operation of the transmitter upon receiving an enabling signal from the communication control device.

15. A method according to claim 12, further comprising:

conditioning the communication signal received at the input of the receiver before it is amplified.

16. A method according to claim 12, wherein the signal is logarithmically amplified in the receiver.

* * * * *